United States Patent [19]
Eubank

[11] Patent Number: 6,110,246
[45] Date of Patent: Aug. 29, 2000

[54] AIR PRECLEANER HAVING STATIONARY VANES AND ROTATING IMPELLER

[75] Inventor: Gerry E. Eubank, Arlington, Tex.

[73] Assignee: Dreison International, Inc., Cleveland, Ohio

[21] Appl. No.: 09/121,170

[22] Filed: Jul. 23, 1998

[51] Int. Cl.[7] .............................. B01D 45/04; B01D 45/14
[52] U.S. Cl. ............................... 55/394; 55/401; 55/404; 55/406; 55/457; 55/DIG. 14
[58] Field of Search .................... 55/385.3, 394, 55/396, 397, 400, 401, 404, 406, 416, 457, DIG. 14, 443

[56] References Cited

U.S. PATENT DOCUMENTS

| | | |
|---|---|---|
| Re. 33,085 | 10/1989 | Petersen . |
| 1,165,401 | 12/1915 | Fender . |
| 1,281,238 | 10/1918 | Wegner . |
| 1,843,091 | 1/1932 | Bull ........................................... 55/457 |
| 2,322,414 | 6/1943 | Bowen ....................................... 55/416 |
| 2,936,043 | 5/1960 | Armstrong et al. ....................... 55/457 |
| 3,670,480 | 6/1972 | Petersen . |
| 3,707,830 | 1/1973 | Gustavsson ............................... 55/457 |
| 3,973,937 | 8/1976 | Petersen . |
| 4,048,911 | 9/1977 | Petersen . |
| 4,173,458 | 11/1979 | Stiles . |
| 4,201,557 | 5/1980 | Petersen . |
| 4,373,940 | 2/1983 | Petersen . |
| 4,459,141 | 7/1984 | Burrington et al. . |
| 4,547,207 | 10/1985 | Petersen . |
| 5,022,903 | 6/1991 | Decker . |
| 5,059,222 | 10/1991 | Smith . |
| 5,449,391 | 9/1995 | Decker . |
| 5,498,273 | 3/1996 | Mann ......................................... 55/396 |
| 5,505,756 | 4/1996 | Decker . |
| 5,656,050 | 8/1997 | Moredock . |

FOREIGN PATENT DOCUMENTS

| | | |
|---|---|---|
| 71.07785 | 9/1972 | France . |
| 537557 | 12/1929 | Germany . |
| 483058 | 7/1953 | Italy . |
| 615247 | 7/1978 | U.S.S.R. ................................... 55/416 |
| 4227 | 3/1988 | United Kingdom . |

OTHER PUBLICATIONS

Two-sided brochure entitled "turbo II Pre-Cleaners" Form 3-001-015 copyright—USA—3-93.
Two-sided brochure entitled "Clean Air for your Engine . . . with a turbo Pre-Cleaner" Form 3-001-012 Dated Jun. 1986.

*Primary Examiner*—David A. Simmons
*Assistant Examiner*—Robert A. Hopkins
*Attorney, Agent, or Firm*—Fay, Sharpe, Fagan, Minnich & McKee, LLP

[57] ABSTRACT

An air precleaner for centrifugally ejecting heavier than air particulates from an airstream for use in an apparatus having an air intake includes a hood having an opening through which air enters the precleaner. A vane assembly includes a centrally positioned dome, a collar encircling the dome and a plurality of vanes each being connected at an inner end to the dome and at an outer end to the collar. Each vane is angled in relation to a horizontal plane. The vane assembly further includes a horizontal wall extending radially outward from the collar. An impeller assembly is rotatably mounted to the vane assembly. Also provided is a base on which the vane assembly is supported via the horizontal wall. The hood, the vane assembly and the base are secured to each other and the air exits the precleaner through the base.

20 Claims, 5 Drawing Sheets

AIR PRECLEANER HAVING STATIONARY VANES AND ROTATING IMPELLER

BACKGROUND OF THE INVENTION

This invention pertains to air precleaners. More particularly, this invention relates to an air precleaner employing a vane assembly and a rotating impeller assembly.

Air precleaners are used for removing particulates from the air prior to introducing the air through an air cleaner or filter, which is connected to a carburetor or air intake structure, of an internal combustion engine. Precleaners are generally located on the open inlet side of the air intake pipes or stacks of an internal combustion engine. The function of the precleaner is to remove as many contaminants from the air as possible before it flows into an air filter medium upstream from the internal combustion engine.

All precleaners operate on the principle of centrifugal separation. Outside air, with its entrained contaminants, enters the precleaner from the vacuum created by the engine. The air and contaminants traverse a set of fixed, static, vanes which cause the air to circulate at a great speed. Centrifugal force throws the contaminants and moisture towards the outer wall of the precleaner. The contaminants follow the wall until they reach an opening where they are discharged back into the atmosphere or collected. Clean, dry air is then allowed to enter the air filter and subsequently the internal combustion engine.

As precleaners work on centrifugal separation, greater air flow velocity will result in better separation between air and contaminants. The best contaminant separation happens when the engine is running at a high speed (in rpm) thus causing a high velocity of the air flow coming into the precleaner. As the velocity of air flow decreases, the centrifugal force on the contaminants also decreases reducing the separation efficiency of the precleaner.

Undesirable contaminants in the atmosphere include particulate matter such as dirt, dust, sand, snow and the like. While most engines include air filters which are meant to remove such contaminants from the air that feeds the engine, engine precleaners are also used in order to extend the life of the air filter and extend the engine's life while at the same time improving fuel economy.

Several different designs of air precleaners are commercially available in the marketplace. In one design, an air precleaner uses a rotatable impeller or spinner to separate particles from air, discharge the dirty air and particle mixture circumferentially from a housing and direct the clean air to the air intake structure of an engine. The clean air moves centrally through a stack to the engine in response to a vacuum pressure on the air moving to the engine. This air precleaner has an air inlet vane assembly located in the bottom of the housing. The air flows upwardly in a circular path into a centrifugal separation chamber and then turns downwardly into the centrally located clean air exit opening. The impeller is used to pump air and particulate matter out through side discharge openings. This type of air precleaner, however, does not take full advantage of the power of the vortex-like air flow in the mouth region of the clean air outlet passage.

Known air precleaners have also included a design in which air flows into the top of the air precleaner and flows axially downwardly through the precleaner and into the intake stack of the engine. Although such precleaners may perform adequately with respect to particulate material, this is sometimes accomplished at the expense of reduced air flow. In other words, the precleaner itself may become an air restriction. The known precleaners of this type do not use static vanes which cause the air to circulate at as great a velocity as the vanes could. Also, some precleaners are only useable when positioned in one orientation, i.e. positioned on a vertical axis or positioned on a horizontal axis.

Accordingly, it has been considered desirable to develop a new and improved air precleaner which would overcome the foregoing difficulties and others while providing better and more advantageous overall results.

BRIEF SUMMARY OF THE INVENTION

An air precleaner for centrifugally ejecting heavier than air particulates from an airstream for use in an apparatus having an air intake is provided.

More particularly, the air precleaner comprises a hood having an opening through which air enters the precleaner and a vane assembly including a centrally positioned dome, a collar encircling the dome and a plurality of vanes, each being connected at an inner end to the dome, and at an outer end to the collar. Each vane is angled in relation to a horizontal plane. An impeller assembly is rotatably mounted to the vane assembly. Also provided is a base to which the vane assembly and the hood are secured. The base includes a clean air exit port. A rounded protrusion is provided on a first face of the base and encircling the clean air exit port to promote laminar air flow and to prevent direct access of liquid to the exit port.

In accordance with another aspect of the present invention, an apparatus is provided for separating particles from a gas carrying the particles.

More particularly in accordance with this aspect of the invention, the apparatus comprises a housing including a separation chamber, the housing having an inside wall surface surrounding the chamber. The housing comprises an inlet opening through which air enters the precleaner and a vane assembly including a centrally positioned dome, a collar encircling the dome and a plurality of vanes each connected at a radially inner edge to the dome and at a radially outer edge to the collar. Each vane has a fully concave surface along which inlet air flows. The vanes are angled in relation to a horizontal plane. A dirty air exhaust port is provided through which air entrained dirt and dust particles exit the housing. Also provided is a clean air exhaust port. An impeller assembly is rotatably mounted in the separation chamber.

One advantage of the present invention is the provision of a new and improved air precleaner.

Another advantage of the present invention is the provision of an air precleaner having a vane assembly which includes a set of static vanes having a fully concave surface along which inlet air flows causing the air to rotate at a great centrifugal speed in relation to forward motion. This construction also allows for a substantially laminar air flow.

Still another advantage of the present invention is the provision of an air precleaner which includes a cover, a vane assembly, a rotating impeller assembly and a base that can be secured to each other, or disconnected from each other, in a simple manner. This enables ease of manufacture, assembly and repair of the air precleaner.

Yet another advantage of the present invention is the provision of an air precleaner which includes a pair of different covers that can be selectively secured to a vane assembly, a rotating impeller assembly and a base. Having two different covers enables the air precleaner to be employed in a substantially vertical orientation using one of the covers and in a substantially horizontal orientation when using the other cover.

An additional advantage of the present invention is the provision of an air precleaner having a base with a rounded wall encircling the clean air exit opening of the base. This construction allows for a substantially laminar flow of air from a dirt separation chamber into the clean air exit opening thereby increasing the efficiency of the air precleaner.

A further advantage of the present invention is the provision of an air precleaner having a vane assembly including a centrally positioned dome, a collar encircling the dome and a plurality of vanes which are each connected at a radially inner edge to the dome and at a radially outer edge to the collar. There is an annular chamber defined in the dome. The dome annular chamber is open to a chamber defined between the vane assembly and a base of the air precleaner to promote air flow.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts preferred embodiments of which will be described in detail in this specification and illustrated in the accompanying drawings which form a part hereof and wherein.

DETAILED DESCRIPTION OF THE PREFERRED EMBODIMENTS

Figure 1:
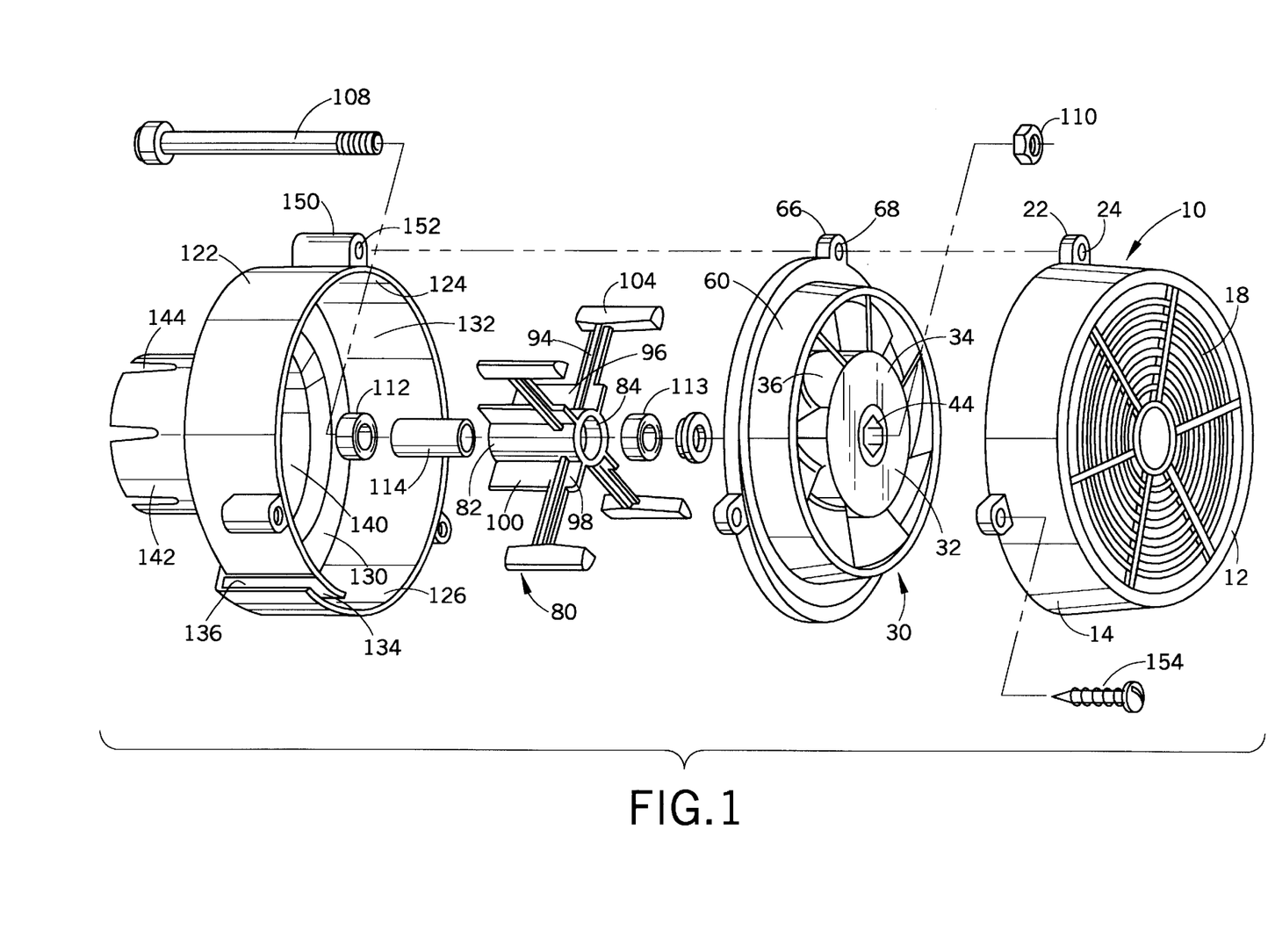
FIG. 1 is an exploded perspective view of an air precleaner according to a first preferred embodiment of the present invention.

Referring now to the drawings wherein the showings are for purposes of illustrating preferred embodiments of the invention only and not for purposes of limiting same, FIG. 1 shows an exploded perspective view of an air precleaner according to a first preferred embodiment of the present invention.

Figure 3:
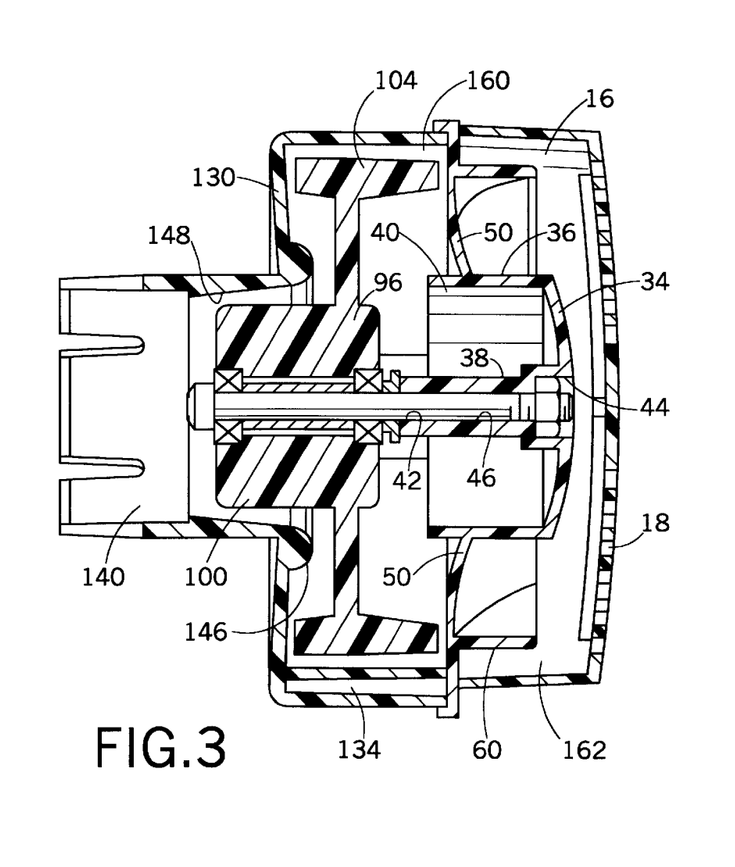
FIG. 3 is a cross sectional view of the air precleaner of FIG. 2 along line 3—3.

The air precleaner comprises a hood 10 having an end wall 12 and a skirt 14 depending therefrom. The end wall and the skirt together form a first chamber 16 (FIG. 3). A plurality of spaced, aligned, openings 18 on the end wall 12 communicate with the first chamber 16. Protruding radially outwardly from the skirt are a plurality of tabs 22 each having an aperture 24 extending therethrough. Positioned beneath the hood 10 is a vane assembly 30. The vane assembly comprises a centrally located dome 32 including a top wall 34 and a peripheral skirt 36. With reference now also to FIG. 3, a stem 38 extends axially from the top wall 34 parallel to the skirt 36. The skirt 36 and the stem 38 define between then an annular chamber 40. An opening 42 extends through the stem 38. The opening comprises an enlarged diameter upper hexagonally shaped socket section 44, as is best illustrated in FIG. 1, and a reduced diameter circular section 46.

Figure 2:
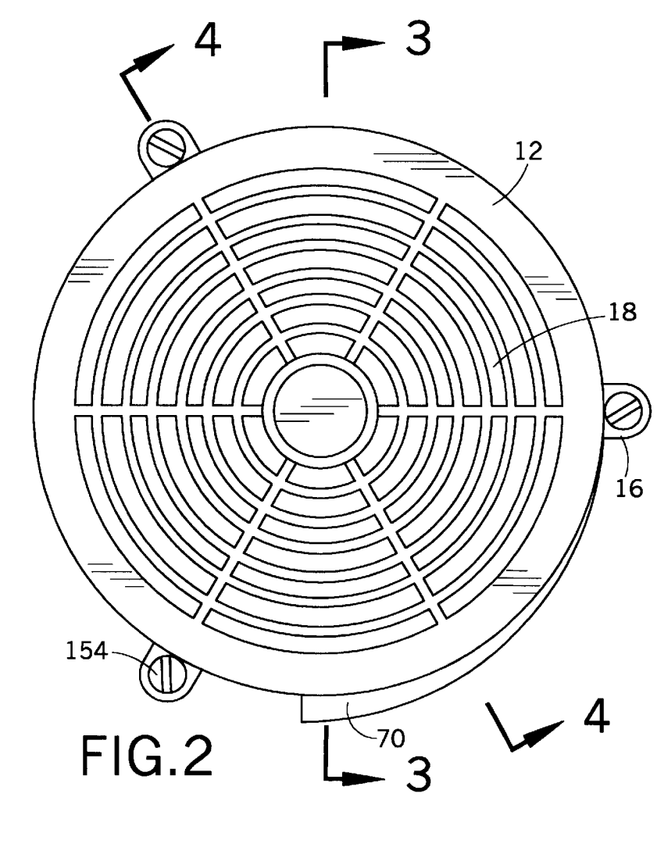
FIG. 2 is a side elevational view of the air precleaner of FIG. 1 in an assembled condition.
Figure 4:
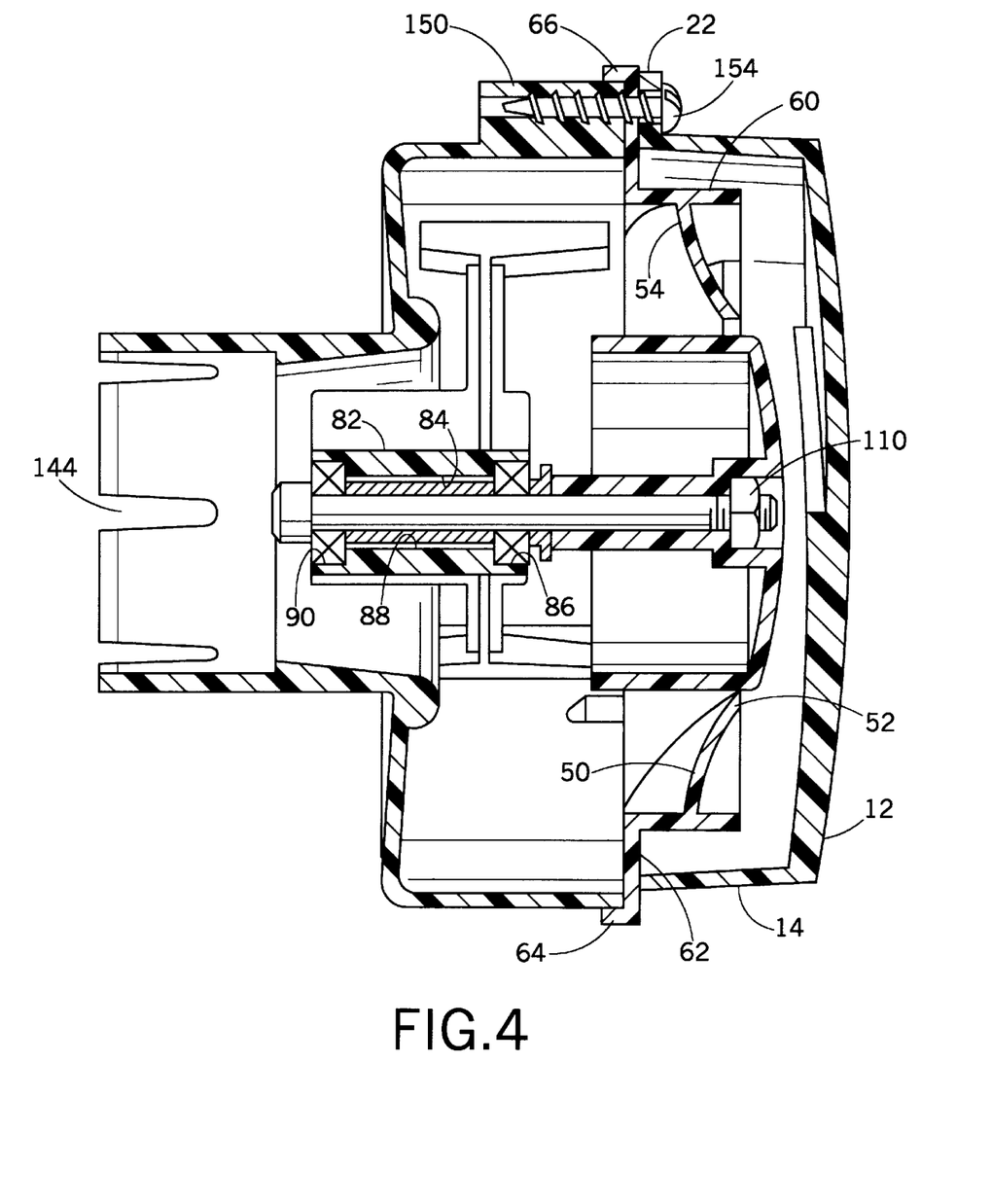
FIG. 4 is a cross-sectional view of the air precleaner of FIG. 2 along line 4—4.

With reference now to FIG. 4, a plurality of vanes 50 each have a radially inner end 52 secured to the skirt 36 of the dome 32 and a radially outer end 54 secured to a collar 60 encircling the dome. Extending radially outwardly of the collar 60, at a bottom edge thereof, is a horizontal wall 62. A flange 64 extends substantially perpendicular from the horizontal wall 60. As shown in FIG. 1, extending radially outwardly from the horizontal wall 62 are a plurality of tabs 66 each having an aperture 68 extending therethrough. With reference now also to FIG. 2, the collar also includes a protruding radial section 70 located between a pair of the tabs 66.

Referring again to FIG. 1, positioned adjacent the vane assembly 30 is a rotating impeller assembly 80. The rotating impeller assembly comprises a hub 82 having a bore 84 extending axially therethrough. As shown in FIG. 4, the bore includes a first section 86 of a first diameter, a second section 88 of a second, and smaller, diameter and a third section 90 of a third diameter. Preferably, the first and third sections 86 and 90 of the bore 84 have the same diameter. As best illustrated in FIG. 1, preferably four arms 94 radiate away from the hub 82. Secured to the hub 82 are a plurality of first blades 96 each of which is aligned with a respective one of the arms 94. The first blades are thus located at the proximal ends of the several arms. Each first blade 96 includes a first section 98 which is positioned above its respective arm 94 and a second section 100 which is positioned below its respective arm. Located at the distal ends of each of the arms 94 is a respective second blade 104.

Also provided is a fastening means for securing the rotating impeller assembly 80 to the vane assembly 30. The fastening means comprises a bolt 108 and a locknut 110. The locknut is hexagonally shaped and is positioned in the hexagonally-shaped socket section 44. The bolt extends upwardly through the hub 82 from the bottom end of the rotating impeller assembly 80. A pair of bearings 112, 113 are positioned in the respective first and third sections 86 and 90 of the hub bore 84. The bearings 112, 113 enable the rotating impeller assembly to smoothly rotate in relation to the vane assembly 30. A tubular bearing spacer 114 is inserted in the bore 84 between the two bearings to prevent side loading of the bearings. Also provided is a conventional washer 116. A step washer is illustrated with the smaller diameter end of the washer resting on the adjacent bearing and the larger diameter end resting on the stem 38. Alternatively, two washers of different diameters can be stacked.

The air precleaner further comprises a base 120. With reference now again to FIG. 1, the base 120 includes an outside wall 122 including a curved first section 124 and a curved second section 126, which has a lesser curvature than the first section and extends outwardly in relation to the first section 124. Also provided is a base wall 130 to which the outside wall 122 is secured. The outside wall and the base wall cooperate to form a chamber 132. Adjacent ends of the first and second sections 124 and 126 form between them a channel 134 which defines a dirty air exit opening 136. Also provided in the base is a clean air exit opening or port 140 which is centrally located on the base wall and is encircled by a sleeve 142 depending from an outer side of the base wall. The sleeve 142 is of a smaller diameter than is the outside wall 122. Defined in the sleeve 142 are a plurality of spaced slots 144. These slots are conventional and are meant to enable the base to be compressed when mounted on an intake stack of a conventional internal combustion engine by means of a conventional encircling clamp (not illustrated).

With reference now to FIG. 3, a ring-shaped collar 146 is positioned on an inner side of the base wall 130 and encircles the clean air exit opening 140. The smooth, curved shape of the collar 146 facilitates a laminar air flow for the exiting air. A laminar air flow is advantageous from the standpoint that it increases the speed of the air flowing through the exit opening thus reducing the pressure drop to the internal combustion engine caused by the presence of the air precleaner. An inwardly tapering section 148 of the clean air opening 140 extends along a portion of the sleeve 142 from the collar 146. This section 148 also promotes laminar airflow. In addition, the narrowed air exit opening formed between the section 148 and the second section 100 of each first blade 96 causes the airflow to speed up. This principle of physics is known as the Venturi effect. An increase in the speed of airflow may cause an increase in the speed of rotation of the impeller assembly enhancing the efficiency of the air precleaner.

Extending radially outward from the first vertical wall section 122 are a plurality of protrusions 150 each having a respective opening 152 extending longitudinally therein. The tabs 22, 66 and the protrusion 150 are aligned such that their respective openings 24, 68 and 152 are coaxial so as to accommodate conventional fasteners 154 in order to secure the hood 10 to the vane assembly 30 and both of these components to the base 120. This is illustrated in FIG. 4.

While in the figures the fasteners 154 are illustrated as extending downwardly from the hood 10, it may be advantageous to have the fasteners extend upwardly from the base 120 in order to reduce the chance of rain damage to the fasteners employed in the air precleaner.

Figure 5:
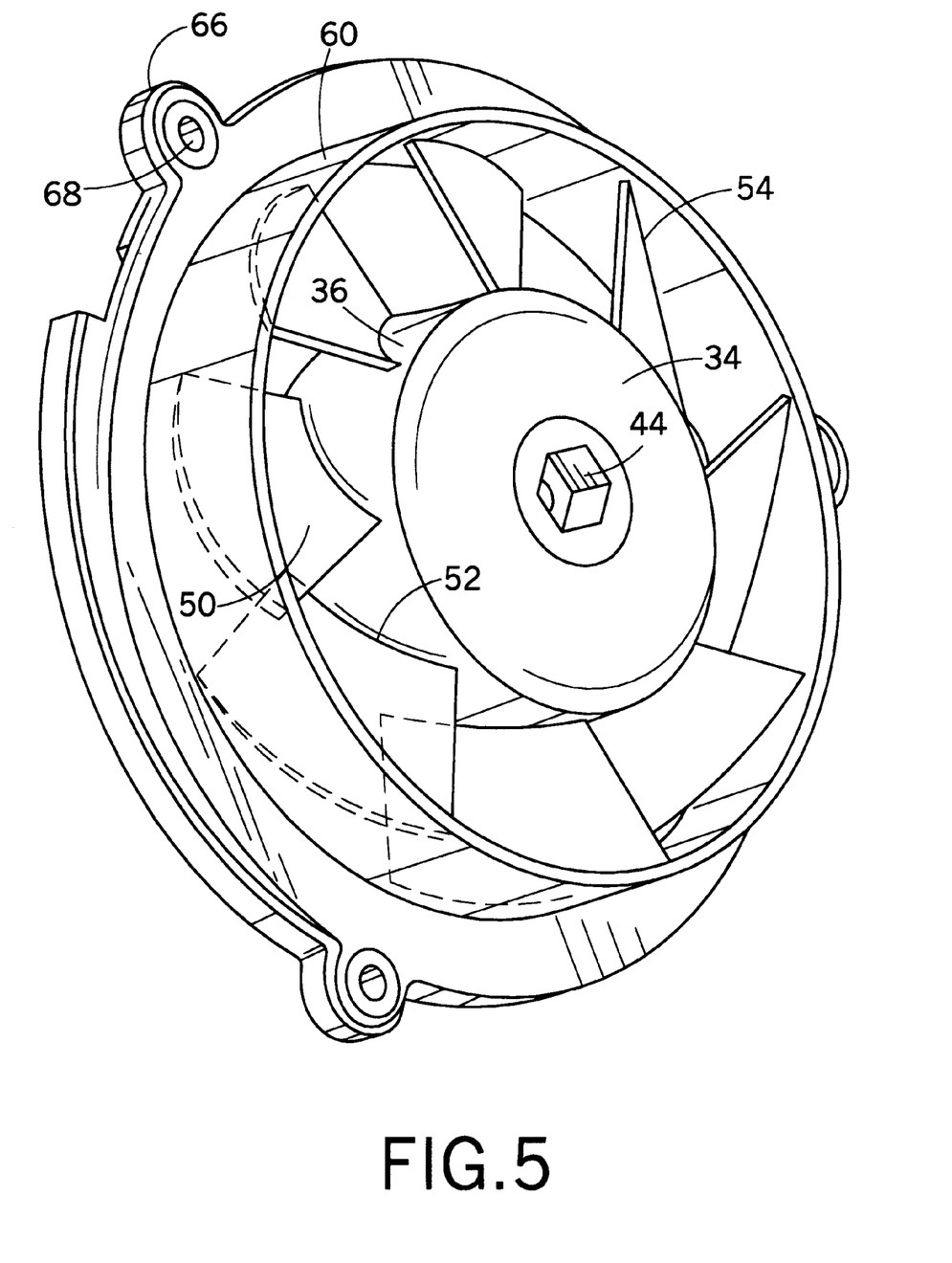
FIG. 5 is a perspective view of a vane assembly of the air precleaner of FIG. 3.

With the air precleaner illustrated herein, atmospheric air flows horizontally through the openings 18 in the hood 10 and into the first chamber 16. In the chamber, the air flows around the dome 32 and across the vanes 50. As best illustrated in FIG. 5, due to the smooth curved shape of the vanes 50, the air acquires a strong swirling motion as it flows into a second chamber 160 defined between the vane assembly 30 and the base 120. As best illustrated in FIG. 5, the inlet vanes 50 are fully concave to inlet airflow resulting in maximum spin for any given forward motion. The concave vanes 50 will provide more spin for a given amount of forward motion. The degree of concavity changes along the length of the vane. In other words, as is illustrated in FIG. 5, the vanes are more concave at their leading edge than at their trailing edge.

The swirling nature of the air flow impels heavier than air dirt particles and moisture radially outward in the second chamber. The swirling nature of the air flow propels the blades 96 and 104 to begin rotation of the rotating impeller assembly 80 thereby increasing the rotational vortex and further propelling particles in the airstream radially outward. These particles then flow through the channel 134 and out the dirty air exit port 136. In the meanwhile, clean air flows radially inward toward the clean air exit port 140. The clean air flows out the exit port 140, through the sleeve 142 and into the intake of the adjacent internal combustion engine.

It should be apparent that the dome 34 blocks direct access of the inlet air to the clean air exit port 140. As best shown in FIGS. 3 and 4, the skirt 14 of the dome extends slightly below the inlet air vanes 50 further restricting direct access of the inlet air to the clean air exit port. It should also be apparent from FIG. 3 that the annular chamber 40 is open to the second chamber 160 and provides additional area for the spinning air to enter the clean air exit port.

Any dirt particles or moisture which enters the openings 18 and flows across the vanes 50, even if it were to reach the base wall 130, would be prevented from entering the clean air exit port opening 140 due to the presence of the ring-shaped collar 146. Rather, all such dirt particles will fall by gravity to the lowest point of the second chamber 160. Also, due to the urging of the spinning air, the dirt will be swept up by the outer blades 104. The dirt will exit through the dirty air exit channel 134 and the outlet port 136 thereof.

The location of the collar 60 is such as to partially mask the second blades 104 providing higher vane speed for better ejection. The reduced diameter of the vane assembly, i.e. of the collar 60 and the vanes 50, allows the hood 10 to be of a larger diameter than the vane assembly and still seat on the base 120. This provides a shorter assembly height than the known air precleaners of this type.

An optimized diameter is provided for the driven vanes 104 as compared with the known air precleaners. While the inclusion of a spinning impeller moves energy from the air stream, it does not hinder airflow and, indeed, often improves it.

With reference again to FIG. 3, dirt particles are prevented from becoming trapped in an area 162 defined between the outer wall of the collar 60 and an inner wall of the skirt 14 because of the horizontal orientation of the entire air precleaner assembly. Any dirt which may become trapped at this location will, due to gravity, fall to the bottom end thereof. From this location, inlet air will push the dirt either back into the atmosphere or into the air precleaner.

In the preferred embodiment of the present invention, the hood 10, vane assembly 30, rotating impeller assembly 80 and base 120 are all made of a suitable conventional thermoplastic material. Of course, it should be recognized that one or more of these components could also be made from any other conventional type of material, such as a metal, e.g. aluminum or the like. However, it has been found that the manufacture of at least the vane assembly 30, from a thermoplastic material is advantageous because it allows the vanes 50 to be molded into a fully concave shape at a reasonable cost.

Figure 6:
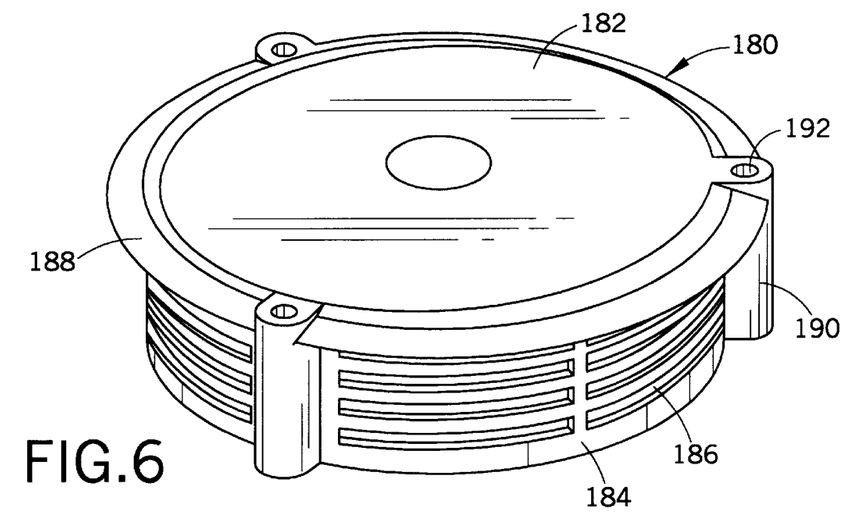
FIG. 6 is a perspective view of a cover for an air precleaner according to a second preferred embodiment of the present invention; and, FIG. 7 is a perspective view in cross-section of an air precleaner employing the cover of FIG. 5.

With reference now to FIG. 6, illustrated there is another type of hood 180 used for an air precleaner according to a second preferred embodiment of the present invention. In this embodiment, like components are identified by like numerals with a primed (') suffix and new components are identified by new numerals.

A hood 180 comprises a top wall 182 and a side wall 184 including a plurality of openings 186 extending therethrough. It should be apparent from FIG. 6 that the top wall has an outer section or overhang 188 which extends radially outward from the side wall 184. Also extending radially outward from the side wall 184 are a plurality of protrusions 190, each having a bore 192 extending therethrough. The hood 180 is employed when the air precleaner of the present invention is used in a vertical orientation. The top wall 182 and the overhang 188 prevent rain from entering the air precleaner.

The air precleaner according to the second preferred embodiment of the present invention also includes a vane assembly 30', a rotating impeller assembly 80' and a base 120' as in the first embodiment.

Figure 7:
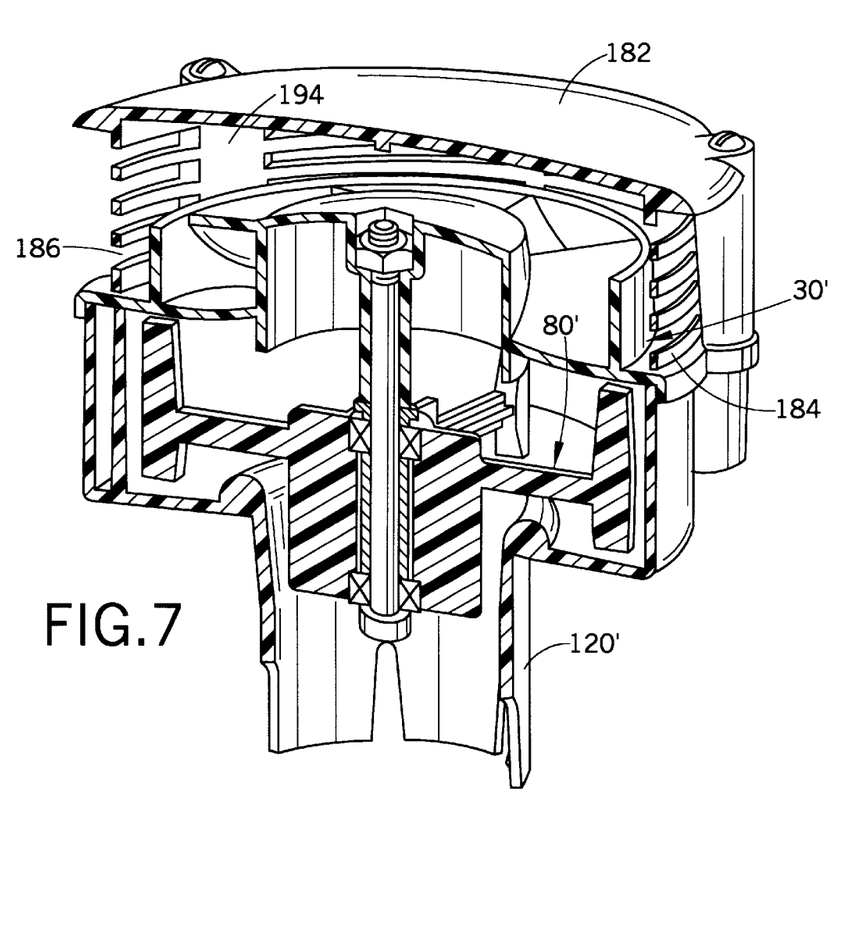

As is illustrated in FIG. 7, the hood top wall 182 and side wall 184 form a chamber 194 for allowing inlet air into the air precleaner. The air precleaner of the second preferred embodiment illustrated in FIG. 7 is meant to be accommodated on an intake stack which is vertically oriented. In contrast, the hood 10 illustrated in FIGS. 1–4 is meant to be accommodated on an intake stack which is horizontally oriented. In this way, rain is not ingested in great quantities in the intake stack. Rather, the openings 18 in the hood 10 are horizontally oriented as are the openings 186 in the hood 180.

Any dirt which may become trapped between an outer wall of the vane assembly 30' and an inner side of the side wall 184 will simply flow out through the apertures 186 back into the atmosphere when the dirt reaches the level of the lowest one of the apertures 186.

The invention has been described with reference to preferred embodiments. Obviously, modifications and alterations will occur to others upon the reading and understanding of the preceding specification. It is intended that the invention be construed as including all such alterations and modifications insofar as they come within the scope of the appended claims or the equivalents thereof.

What is claimed:

1. An air precleaner that separates particulates from air comprising:
    a hood having at least one opening through which air enters the precleaner;
    a vane assembly including a centrally positioned dome, a collar encircling said dome and a plurality of vanes each being connected at an inner end to said dome and at an outer end to said collar, each said vane being angled in relation to a horizontal plane;
    a rotating impeller assembly rotatably mounted to said vane assembly; and,
    a base to which said vane assembly and said hood are secured, wherein said base includes a dirty air outlet opening through which air exits the precleaner and a clean air outlet opening through which air exits the precleaner, a rounded protrusion being provided on a first face of said base and encircling said clean air opening for promoting laminar airflow.

2. The air precleaner of claim 1 wherein said hood comprises a plurality of spaced aligned openings through which air enters the precleaner.

3. The air precleaner of claim 1 wherein said base comprises:
    an outside wall;
    a base wall secured to and extending substantially radially inward from said outside wall, said clean air outlet opening being defined in said base wall; and,
    a sleeve secured to a second face of said base wall and encircling said clean air outlet opening.

4. The air precleaner of claim 1 wherein said sleeve defines a clean air outlet port.

5. The air precleaner of claim 3 wherein said sleeve comprises a radially inward tapered opening defined by an annular side wall connected to said protrusion.

6. The air precleaner of claim 1 wherein said rotating impeller assembly comprises:
    a hub;
    at least one arm secured to and extending radially outward from said hub;
    a first blade mounted at a distal end of said at least one arm; and,
    a second blade mounted at a proximal end of said at least one arm.

7. An air precleaner for centrifugally ejecting heavier than air particulates from an air stream for use in an apparatus having an air intake, comprising:
    a hood having an opening through which air enters the precleaner;
    a vane assembly including a centrally positioned dome, a collar encircling said dome and a plurality of vanes, each vane being connected at a radially inner edge to said dome and at a radially outer edge to said collar, each said vane being angled in relation to a horizontal plane, an annular chamber being defined in said dome;
    a rotating impeller assembly rotatably mounted to said vane assembly; and,
    a base on which said vane assembly is supported, wherein said hood, said vane assembly and said base are secured to each other, and wherein dirty air exits the precleaner through a dirty air outlet port located on said hood and cleaned air exits the precleaner through a clean air outlet port located in said base, said dome annular chamber being open to a chamber defined between said vane assembly and said base to promote airflow;
    wherein said base comprises a sleeve encircling said clean air outlet port and wherein said sleeve includes an inwardly tapered section leading to said clean air outlet port.

8. The air precleaner of claim 7 wherein said hood comprises a plurality of spaced, aligned, inlet openings through which air can enter.

9. The air precleaner of claim 7 wherein said base further comprises:
    an outside wall;
    a base wall secured to and extending substantially radially inward from said outside wall; and,
    wherein said sleeve is secured to a second face of said base wall.

10. The air precleaner of claim 7 further comprising a thickened toroidal wall section encircling said clean air outlet port.

11. The air precleaner of claim 7 wherein said rotating impeller assembly comprises:
    a hub;
    at least one arm extending radially outwardly from said hub; and,
    a blade mounted on said at least one arm.

12. An apparatus for separating particles from a gas carrying the particles, comprising:
    a housing including a separation chamber, said housing having an inside wall surface surrounding said chamber, said housing comprising:
        an inlet opening through which air enters the precleaner,
        a vane assembly including a centrally positioned dome, a collar encircling said dome and a plurality of vanes each being connected at a radially inner edge to said dome and at a radially outer edge to said collar, said vanes being angled in relation to a horizontal plane,
        a dirty air exhaust port through which air entrained dirt and dust particles exit said housing, and
        a clean air exhaust port defined by a sleeve of said housing, wherein said sleeve includes an inwardly tapered section; and,
    an impeller assembly rotatably mounted in said separation chamber.

13. The air precleaner of claim 12 wherein said impeller assembly comprises:

a hub; and, at least one arm extending radially outward from said hub.

14. The air precleaner of claim 13 wherein said impeller assembly further comprises a first blade mounted at a distal end of said at least one arm and a second blade mounted at a proximal end of said at least one arm.

15. The air precleaner of claim 14 wherein said impeller assembly further comprises four arms, each including a first blade and a second blade, said arms being spaced from each other so as to have a cruciform shape.

16. The air precleaner of claim 14 further comprising;

a fastener for securing said impeller assembly to said housing; and, a bearing positioned between said impeller assembly and said housing for enabling rotation of said impeller assembly in relation to said housing.

17. The air precleaner of claim 12 wherein each vane has a concave surface along which inlet air flows and wherein a degree of concavity of each said vane changes along the length of said vane.

18. The air precleaner of claim 17 wherein each said vane is more concave at its leading edge than it is at its trailing edge.

19. The air precleaner of claim 14 wherein said second blade is positioned adjacent said sleeve inwardly tapered section.

20. The air precleaner of claim 19 wherein a narrowed air exit opening is defined between a radially outer edge of said second blade and said sleeve inwardly tapered section.

* * * * *